United States Patent [19]
Sparlin et al.

[11] Patent Number: 5,355,948
[45] Date of Patent: Oct. 18, 1994

[54] PERMEABLE ISOLATION SECTIONED SCREEN

[76] Inventors: Derry D. Sparlin, 9803 Oxted La., Spring, Tex. 77379; Tadayoshi Nagaoka, No. 2-2-91, Mokuzaidouri Mihara-Cho, Minamikawachi-gun, Osaka, Japan, 587

[21] Appl. No.: 971,273

[22] Filed: Nov. 4, 1992

[51] Int. Cl.$^5$ .............................................. E21B 43/08
[52] U.S. Cl. .................................... 166/228; 166/230; 166/235
[58] Field of Search ............... 166/227, 228, 230, 231, 166/233, 234, 235, 236, 242, 243

[56] References Cited

U.S. PATENT DOCUMENTS

| | | | |
|---|---|---|---|
| 3,908,256 | 9/1975 | Smith, III | 166/233 X |
| 4,167,972 | 9/1979 | Sears | 166/233 |
| 4,657,079 | 4/1987 | Nagaoka | 166/231 |
| 4,771,829 | 9/1988 | Sparlin | 166/233 |
| 4,821,800 | 4/1989 | Scott et al. | 166/230 X |

FOREIGN PATENT DOCUMENTS 0973802  11/1982  U.S.S.R. ............................. 166/234

*Primary Examiner*—Terry Lee Melius
*Attorney, Agent, or Firm*—Bernard A. Reiter and Associates

[57] ABSTRACT

A well liner having a selective isolation screen with a limited or less restrictive seal. The well liner includes an elongate base pipe having openings therethrough; surrounded by circumferentially spaced, longitudinal extending spacer bars for forming an inner annulus; one or more annular cylindrical sleeves secured to the exterior of the base pipe; and a continuous wire wrapping surround the spacer bars except at interrupted areas where the isolated permeable seal sections are placed. These seal sections are located at predetermined vertical locations corresponding to specific well requirements of varying lengths and production formations within the wellbore. The continuous wire wrapping and spacer bars are inverted within the permeable seal sections so that the wire wrapping substantially fills the inner annulus and a multitude of spacer bars spaced approximately equal to or slightly larger than the spaces between the wire wrapping form the outer most surface of the seal sections. The ends of the seal sections are coupled to the wire wrapping screen of the well liner for forming a continuous screen surface and seal. The continuous wire wrapping over the spacer bars in a spaced spiral configuration provides a predetermined constant gap between the wire wrapping. The gaps in the wire wrapping are sized to stop movement of formation sand yet allowing continual flow of fluid into and from the wellbore.

27 Claims, 7 Drawing Sheets

(prior art) *Fig 1*

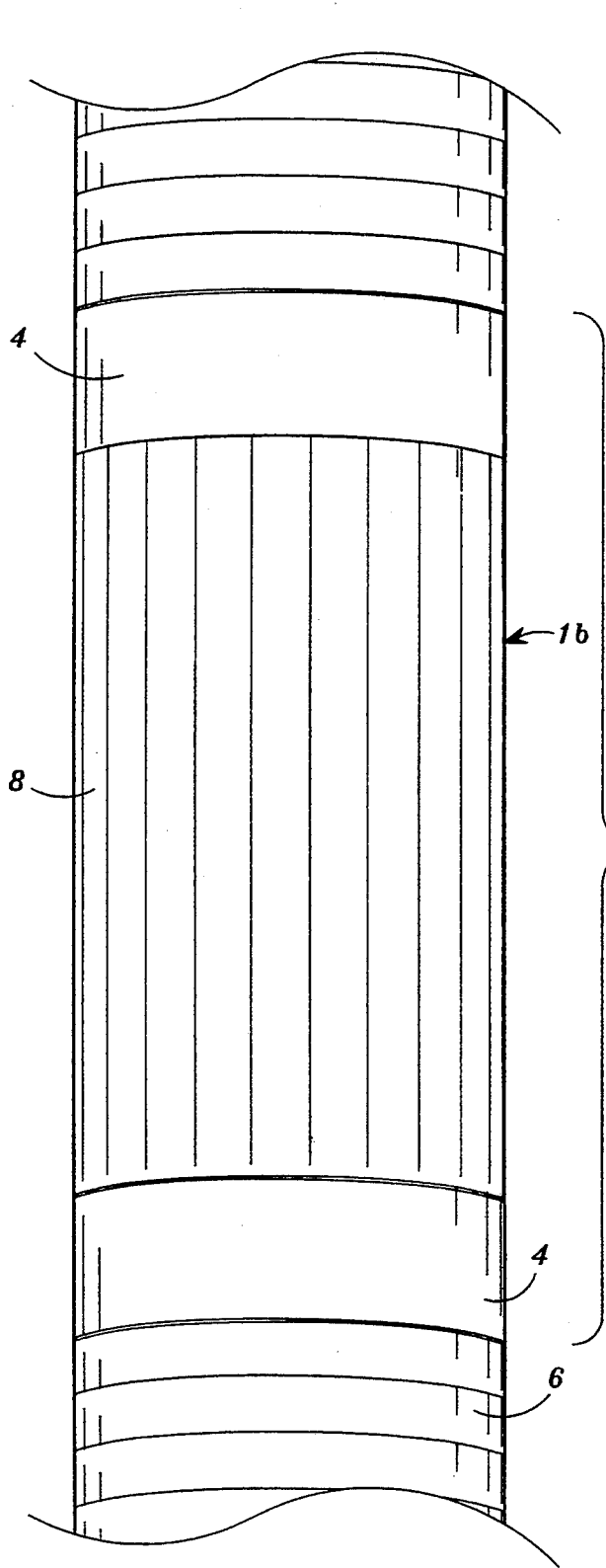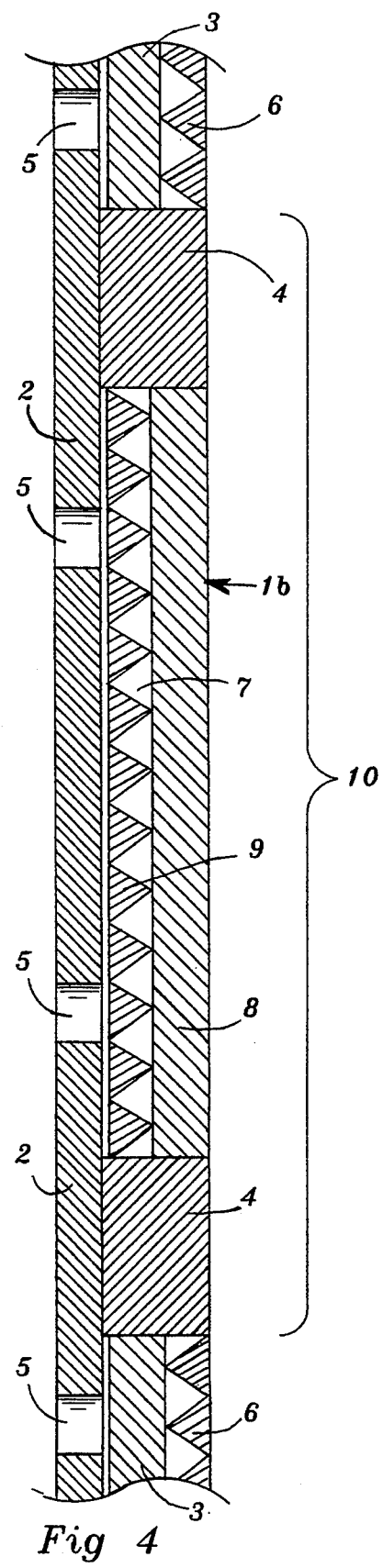
Fig 3
Fig 4

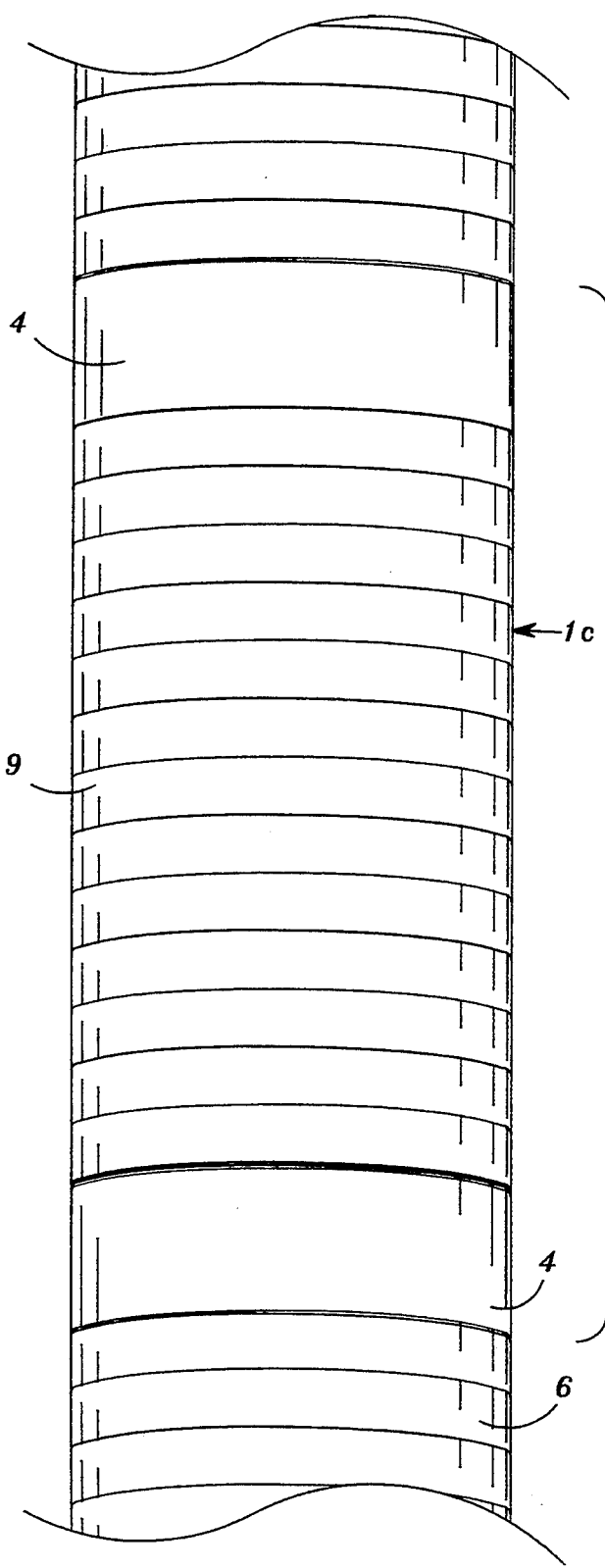
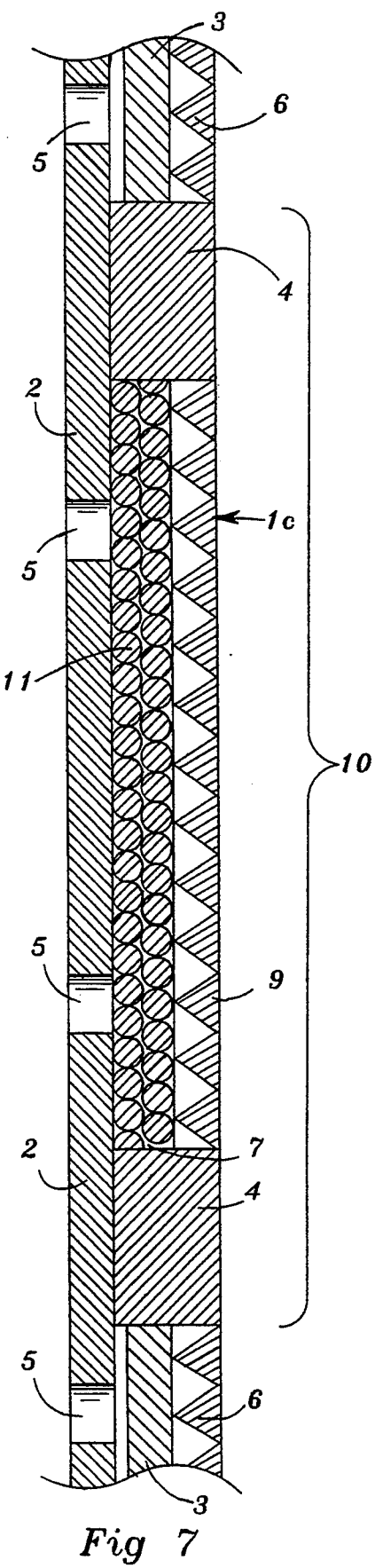
Fig 6
Fig 7

PERMEABLE ISOLATION SECTIONED SCREEN

BACKGROUND OF THE INVENTION

1. Field of the Invention

This invention relates generally to the field of oil well, gas well, water well and subterranean pollution remediation well equipment, and more particularly to a wire wrapped screen having a permeable isolation screen sections for filtering sand and undesirable solids from fluids, gases and toxic extractions at subterranean locations.

2. Brief Description of the Prior Art

Many types of screens and filtering devices or well liners are known in the art that are designed to exclude sand and other solids from fluids and gases produced from oil, gas, water and pollution remediation wells without undue restriction of the production rate of fluids or gases. Well liners are sometimes used as the sole means of filtering sand from the fluids wherein the screen openings are sized to stop the movement of the formation sand and allow continual flow of fluid into the wellbore. Gravel or other particulate matter is also used in conjunction with screens such as "gravel pack" well liners wherein the gravel or particulates are sized to restrain movement of the formation sand and the screen openings are designed to restrain the movement of the gravel or particulates to allow continual flow of fluids therethrough.

Common well liners employ a base pipe having a plurality of openings through the sidewall which is surrounded by longitudinally extending spacer bars, rods, or rings and over which a continuous wire is wrapped in a carefully spaced spiral configuration to provide a predetermined constant gap between the wire wrapping. The gap allows fluids to flow through the wire wrapping and retains the movement of particulate materials such as sand or gravel. Such a well liner is also commonly referred to as a "wire wrapped" screen.

Most "wire wrapped" well liners have the common feature of an "inner annulus" or space between the base pipe and the wire wrapping. The inner annulus is desirable because it allows free transmission of fluids that flow through the wire wrapping gaps into the apertures on the base pipe. The absence of the inner annulus would significantly restrict fluid flow rates radially into the well liner.

The inner annulus in a wire wrapped well liner causes several serious problems during installation of a gravel pack and the stimulation of a well liner or gravel packed well. Problems occur in bypassing fluid through the inner annulus as the gravel is being transported down the "outer annulus", or the gap between the well liner and the wellbore, and bypassing fluid being injected from a well liner through a gravel pack into the formation to stimulate the well or seal a portion of the wellbore.

Bridges of gravel are in part created, or enhanced, as the gravel carrying fluid flows into the inner annulus. As the gravel carrying fluid moves, an increase of gravel concentration in the fluid in the outer annulus results because the gravel is restricted from entering the wire wrapped well liner but fluid enters freely. Thus, when the gravel concentration increases beyond a critical magnitude, a bridge is formed which wedges in the outer annulus and halts further movement of gravel before the outer annulus is fully packed with gravel.

Another problem results from the fluid freely entering the inner annulus from the outer annulus during gravel packing in highly deviated wellbores. The problem is commonly referred to as "duning". In wellbores having angles of 45 degrees to 90 degrees plus from the vertical, and especially those requiring the gravel to be packed along intervals ranging from several feet to more than a thousand feet, the gravel tends to fall to the low side of the wellbore due to gravity as it is being transported by the fluid. As gravel accumulates, the fluid is diverted to the high side of the wellbore and into the well liner, thereby reducing the velocity of carrier fluid in the outer annulus and the capability of the fluid to force gravel toward the bottom end of the wellbore.

No known art tackles this problem. For example, Gruesbeck et al., U.S. Pat. No. 4,046,198, attempts to solve this problem by providing the means of inserting a wash pipe in the base pipe to reduce the ease with which fluid can flow into the pipe. Maly et al., U.S. Pat. No. 3,637,010 teaches the use of flexible baffles to restrict the flow of fluids into the base pipe. However, both teachings ignore the effect of the inner annulus between the base pipe and wire wrapped screen.

Still a further problem is that gravel bridges form above intervals where no fluid flow occurs or where the fluid flow is significantly restricted, from the outer annulus into the well liner, creating "voids" in the gravel pack, or loosely packed intervals in the vicinity of the no (low) flow area. This problem may occur at the seal sections of a selective isolation screen and/or is most likely to occur in high angle wellbores. Gravel bridges are often unstable and may slump or fall and loosen the packing arrangement of the gravel, thus reducing the effectiveness of the gravel to stop formation sand movement.

Sparlin, U.S. Pat. No. 4,771,829 teaches the use of selective isolation seals positioned in the "inner annulus" which control the flow of fluid therein. One limitation of this design is that fluid cannot flow radially through the sealed sections of the screens. This prevents fluids from being produced from the wellbore directly adjacent to an inner annulus seal directly into the well liner, and inhibits tight packing of gravel in the outer annulus in the immediate vicinity of each inner annulus seal.

Other relevant patents are noted in Sparlin U.S. Pat. No. 4,771,829.

BRIEF DESCRIPTION OF THE DRAWINGS

FIG. 3 shows an elevational view of the seal section of the present invention.

FIG. 4 shows an elevational view of a cross-section of the wall of the seal section.

FIG. 6 shows an elevational view of the seal section of an alternate embodiment of the present invention.

FIG. 7 shows an elevational view of a cross-section of an alternate embodiment of the wall of the seal section.

SUMMARY OF THE INVENTION

Figure 1:
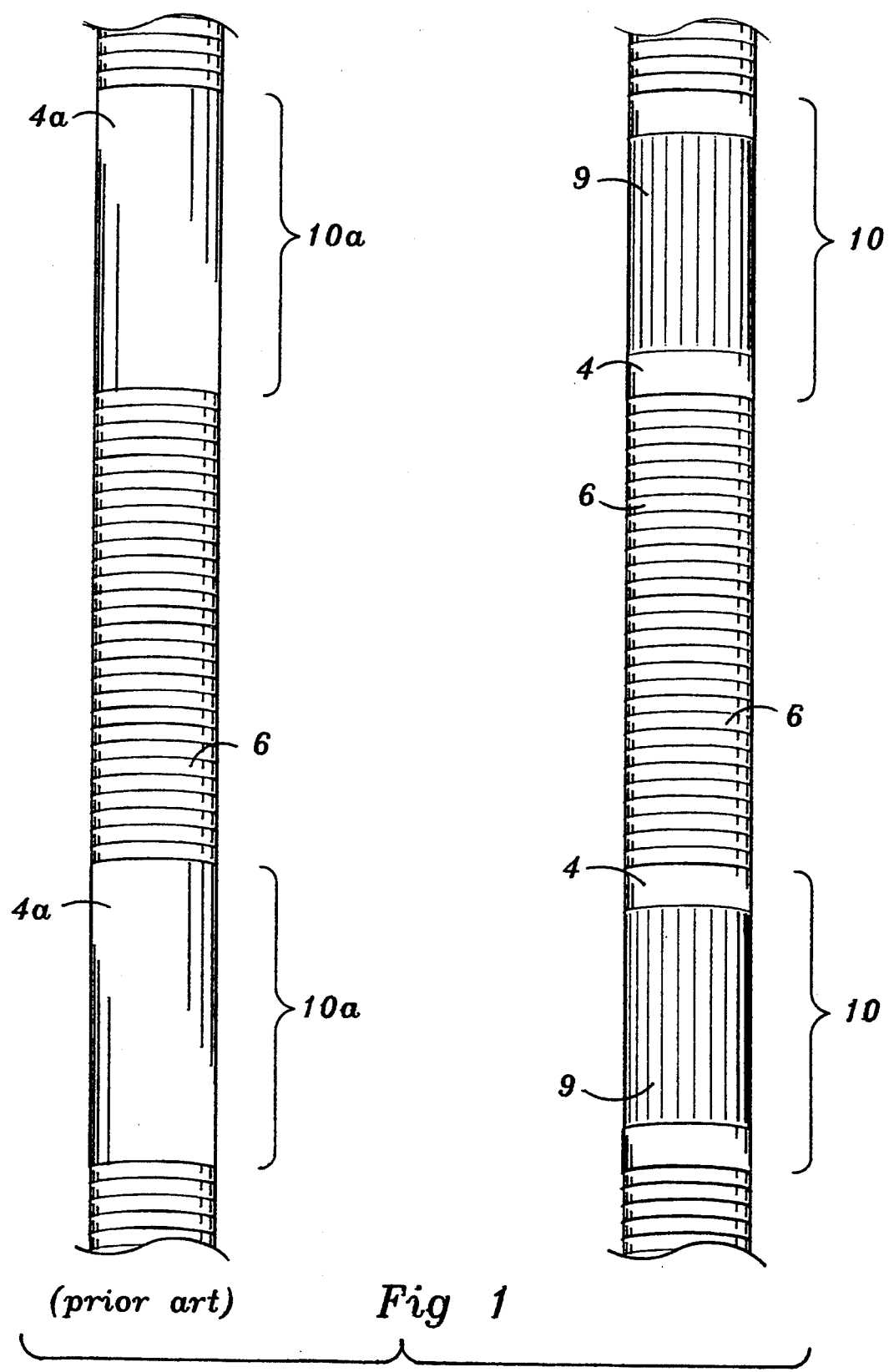
FIG. 1 shows an elevational view of a section of the prior art screen (on the left) and an elevational view of the screen of the present invention (on the right).

It is therefore the object of the present invention to restrict fluid flow longitudinally through the inner annulus of selected seal sections of a wire wrapped well liner.

It is another object of this invention to provide a well liner having one or more seal sections within the inner annulus at predetermined locations corresponding to specific well requirements of varying lengths and production or productive formations within the wellbore.

Another object of this invention is to provide a well liner which will effectively control the injection of acids and fluids into the screen such that every section of the screen may be selectively washed.

It is another object of this invention to allow fluid flow radially through the selected seal sections of a wire wrapped well liner.

Another object of this invention is to provide a well liner whereby fluids may be injected into selective sections of the well liner to restrict bypassing of fluids through the inner annulus.

Another object of this invention is to provide a well liner which will facilitate gravel packing operations in highly deviated wellbores.

A further object of this invention is to provide a well liner which will aid in injection of water shut off chemicals, diverting of injected water from thief zones and other treatments requiring some control of injection into selected locations.

A still further object of this invention is to provide a well liner which is simple in construction, economical to manufacture, and rugged and durable in use.

The present invention is distinguishable over the prior art in general, and the above patents in particular, by having a well liner with a selective isolation screen with a limited or a less restrictive seal. The well liner of the present invention includes an elongate base pipe having openings therethrough; surrounded by circumferentially spaced, longitudinally extending spacer bars; one or more annular cylindrical sleeves secured to the exterior of the base pipe; and a continuous wire wrapped screen therearound for forming an inner annulus, except at interrupted areas with isolated permeable "seal sections". These seal sections are located at predetermined vertical locations corresponding to specific well requirements of varying lengths and production formations within the wellbore.

The continuous wire wrapping and support rods are inverted within the permeable seal sections so that wire wrapping substantially fills the inner annulus. A multitude of support rods spaced approximately equal to or slightly larger than the spaces between the wire wrapping form the outermost surface of the seal sections. The ends of each seal section are coupled to the wire wrapping of the well liner for forming a continuous screen surface with the seal.

An alternate design provides a seal section having multiple closely spaced rods within the inner annulus surrounded by continuous wire wrapping with one or more seals at each end.

Another alternate design provides a well liner having a sleeve member along the seal section in the inner annulus. The sleeve member has longitudinal narrow slots along the periphery of the sleeve member. These narrow slots align with the apertures on the base pipe having apertures that are wider than the narrow slots on the sleeve member. The sleeve member is further surrounded by the continuous wire wrapping.

Another alternate design accomplishes the same purpose by filling the inner annulus within the seal section with a permeable particulate matter such as gravel or permeable sintered metal or mesh material such as steel wool and other such permeable materials that will restrict fluid flow longitudinally through the inner annulus but which allows fluid flow radially through the inner annulus.

The gaps in the wire wrapping and/or spacer rods in these designs are sized to restrict the movement of the formation sand and to allow continual production fluid flow from the formation radially into the well liner. Fluid carrying gravel or other particulate matter may be pumped down the bore hole in the outer annulus between bore hole or an outer casing and the well liner. The gravel and other particulates are sized to restrain movement of the formation sand and the screen openings are designed to restrain the movement of the gravel or particulates to allow continual fluid flow therethrough.

Thus, the improvements of the present invention over the prior art include: improved packing operations since the packing of gravel around the well liner is enhanced by allowing gravel packing fluid to enter the entire screen length and sealable sections during gravel packing operations; improved production of oil, gas or water by allowing production through the entire screen, including the sealable sections; sealable sections of the well liner that still function as seals by interrupting flow in the inner annulus; short sections of the well liner that may be isolated by positioning a multiple flexible cup tool or expandable inflatable sealing or packer elements of a tool inside one or more seal sections for the purpose of injecting stimulation fluids such as acid or steam or sealing fluids such as grouting agents.

DETAILED DESCRIPTION OF THE INVENTION

Referring to the drawings by numerals of reference, there is shown in FIG. 1, a well liner commonly referred to as a "wire wrapped" screen according to the prior art. Prior art well liners of this type employ a base pipe (not shown) and are surrounded by longitudinally extending spacer bars (not shown) and over which a continuous wire 6 is wrapped in a carefully spaced spiral configuration. The spacer bars provide a predetermined constant gap between the wire wrapping 6 and base pipe to form an inner annulus. The base pipe has a plurality of openings through the sidewall.

The prior art well liner as shown may be used inside of an outer casing which is placed in the wellbore or in uncased wellbores. It should be understood that the present well liner may also be used in either cased or uncased wellbores. The casing in cased wellbores is usually perforated to allow production of fluids from formations at preselected zones. As the production fluid flows from the formation, sand and other particulate material are carried with the fluid and enter the outer annulus between the borehole and the well liner.

Gravel or other particulate matter is also used in conjunction with well liners during "gravel pack" operations wherein gravel or other particulates are pumped down the borehole in the outer annulus between the casing and the outer surface of the well liner. The gravel and other particulates are sized to restrain movement of the formation sand and the gaps or screen openings are designed to restrain the movement of the gravel or particulates to allow continual fluid flow therethrough.

Thus, where well liners are the sole means for filtering sand from the fluids, as in the case where the well bore is not gravel packed, the gaps in the wire wrapping still stop the movement of the formation sand allowing continual flow of fluid into the well liner.

Figure 2:
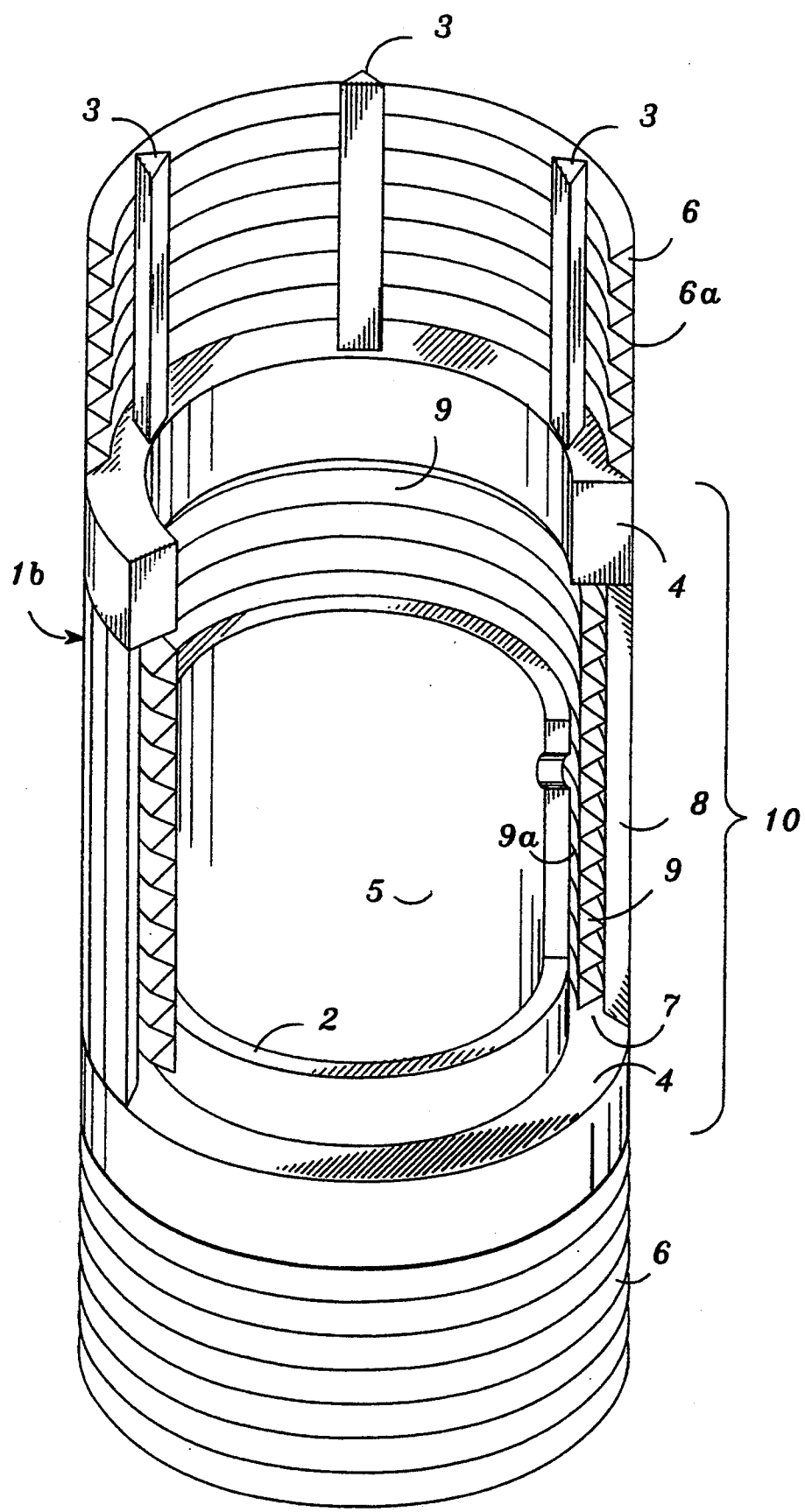
FIG. 2 shows a cut-away perspective view of the screen of the present invention showing the seal section.

Referring now to FIGS. 2, 3, and 4, there is shown a well liner 1b of the preferred embodiment having a selective isolation well liner according to the present invention.

The well liner 1b includes an elongate base pipe 2 surrounded by circumferentially spaced, longitudinally extending, triangular spacer bars 3. Although this triangular shape works well, it need not be shaped so. Further, one or more annular rings or cylindrical sleeves 4 are secured to the exterior of the base pipe 21 at predetermined vertical locations corresponding to specific well requirements of varying lengths and production formations within the wellbore. These rings or cylindrical sleeves 4 form the "seals" in the inner annulus 7. The base pipe 2 has a plurality of openings 5 through the sidewall. The openings 5 in the base pipe 2 may be in the form of holes, slots, or the like, and are positioned such that the sleeves 4 do not cover the openings 5.

A continuous wire 6 is wrapped over the spacer bars 3 and coupled to the sleeves 4 in a carefully spaced spiral configuration to form the inner annulus 7 between the base pipe 2 and wire wrapping 6. A suitable wire configuration would comprise a wire of stainless steel approximately ¼" thick having a generally triangular (keystone shaped) cross section 7. The dimension would, of course, depend on the well requirements and production targets.

The gaps 6a in the wire wrapping 6 are sized to stop the movement of the formation sand and allow continual flow of fluid into and from the wellbore. In "gravel pack" operations, gravel or other particulates are sized to restrain movement of the formation sand and the screen openings or gaps 6a are designed to restrain the movement of the gravel or particulates to allow continual flow of fluids therethrough.

The preferred number of openings or holes 5 in the base pipe 2 may range from 1–250 per foot, with the preferred range of from 1–20 per foot. The sizes of the holes 5 in the base pipe 2 may range from about 1/16 inch to 2 inches diameter with the preferred range being from ⅜ inch to 1 inch diameter. If slots are used, they may range from about 1/16 inch to 2 inch in width and from about 1 inch to 10 inches in length, with the preferred range of from ⅜ inch to 1 inch wide by 2 inches to 6 inches long.

The cylindrical sleeves 4 may be constructed of suitable materials such as metal, plastic, or rubber, and may be very thin to only fill the inner annulus 7 at selected points, or may be quite long to fill the inner annulus 7 over a long interval where no flow is desired. The sleeves 4 are placed strategically to prevent restriction of the flow from the producing formations of the wellbore.

The preferred length of a sleeve 4 may range from about 1 inch to about 5 inches. The preferred number of sleeves 4 may range from about 1 per each foot of well liner length to about 1 per each 50 foot length of well liner. It is to be understood that the preferred spacing of the sleeves 4 is dictated by the spacing of perforations 5 in the casing or open hole, and the permeability variations of productive formations exposed to the perforations or to the well liner.

The prior art well liner as illustrated in FIG. 1 is a base pipe with open holes surrounded by a solid seal or sleeve 10a that stops longitudinal radial fluid flow through the inner annulus, and the inner annulus is surrounded by a continuous wire wrapping 6. The disadvantage of the prior art is that the production rate is substantially affected and lost in the area surrounding the seal 10a. The seals 10a of the prior art may range from about 1 inch to about 5 feet. Clearly, a well liner with the latter seal will have substantial inefficiency in production rates because of the loss of the production zone where the seal 10a exists.

The present invention cures this inefficiency by providing a seal section 10 that allows production, yet provides selective isolation in the inner annulus 7 with a much smaller seal or sleeve 4. The preferred embodiment of the present invention 1b provides an inverted wire wrapping seal section 10 having a base pipe 2 with spaced apertures 5 surrounded by a continuous wire wrapping 9 substantially filling the inner annulus 7, and which is surrounded by a multiple of spacer rods 8. In FIGS. 2 through 4, the preferred embodiment 1b is disclosed as having a seal section 10 comprising two seals 4 surrounding the inverted wire wrapping seal section 10. The wire wrapping 9 in the inner annulus 7 is identical with the wire wrapping 9 in the rest of the well liner 16 with the exception of its placement. The spacer bars 8, however, differ from the rest of the well liner 1b. The spacer bars 8 in the seal section 10 are more concentrated to essentially comprise a vertical wire wrapping between the seals 4. The total length between the seals 4 may comprise 12 inches, with the seals 4 comprising 1 inch in length each and the wire wrapping 9 and the spacer rods 8 comprising about 10 inches in length. These specifications, however, may differ depending on the well requirements.

If gravel is used as permeable matter, the pipe base 2 may preferably be wrapped with a cylindrical fine mesh screen (not disclosed herein), preventing entering of gravel or plastic coated gravel into the inside of the pipe base 2 through apertures 5.

Another possible variation of the above embodiment comprises a common wire wrapped well liner with a cross-section that shows a base pipe 2 with spaced apertures 5, surrounded by spacer rods 3 in the inner annulus 7, and which is surrounded by a continuous wire wrapping 6. The seals section 10 is surrounded by two seals 4. The seals 4 are essentially the same as those previously described herein. Dimensions, of course, may vary with predetermined vertical locations corresponding to specific well requirements of varying lengths and production formations within the wellbore.

Figure 5:
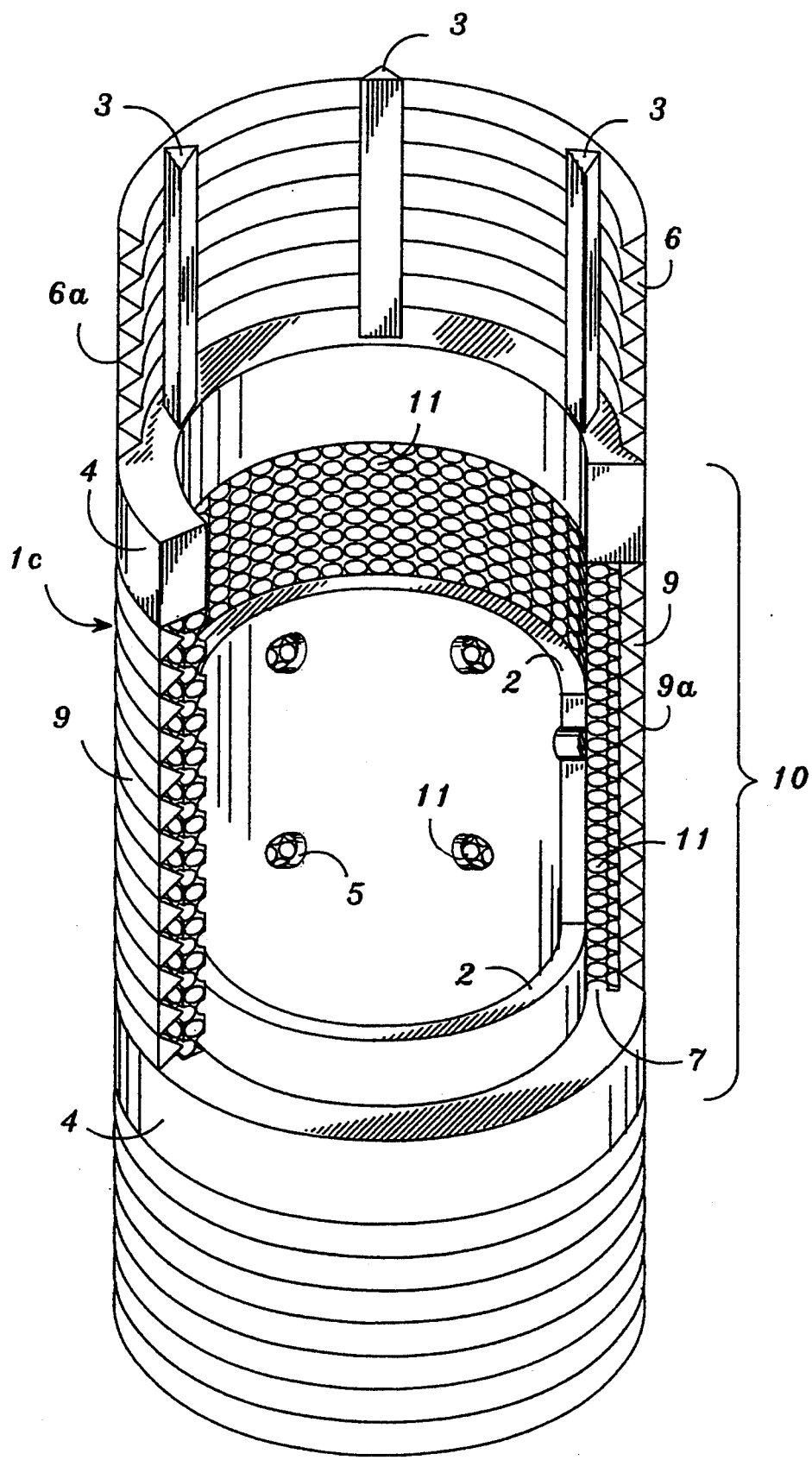
FIG. 5 shows a cut-away perspective view of the screen of an alternate embodiment of the present invention showing the seal section.

Another embodiment is disclosed in FIGS. 5 through 7. This embodiment 1c discloses a seal section 10 having a base pipe 2 with spaced apertures 5, surrounded by an inner annulus 7 filled with gravel or other permeable matter 11 and which is surrounded by continuous wire wrapping 9. Thus, the seal section 10 between the seals 4 comprises permeable matter 11 and continuous wire wrapping 9. The permeable particulate matter 11 may comprise of gravel, or permeable sintered metal or mesh material such as steel wool or other such permeable materials that will restrict fluid flow longitudinally through the inner annulus 7 but which allows fluid flow radially through the inner annulus 7.

Figure 8:
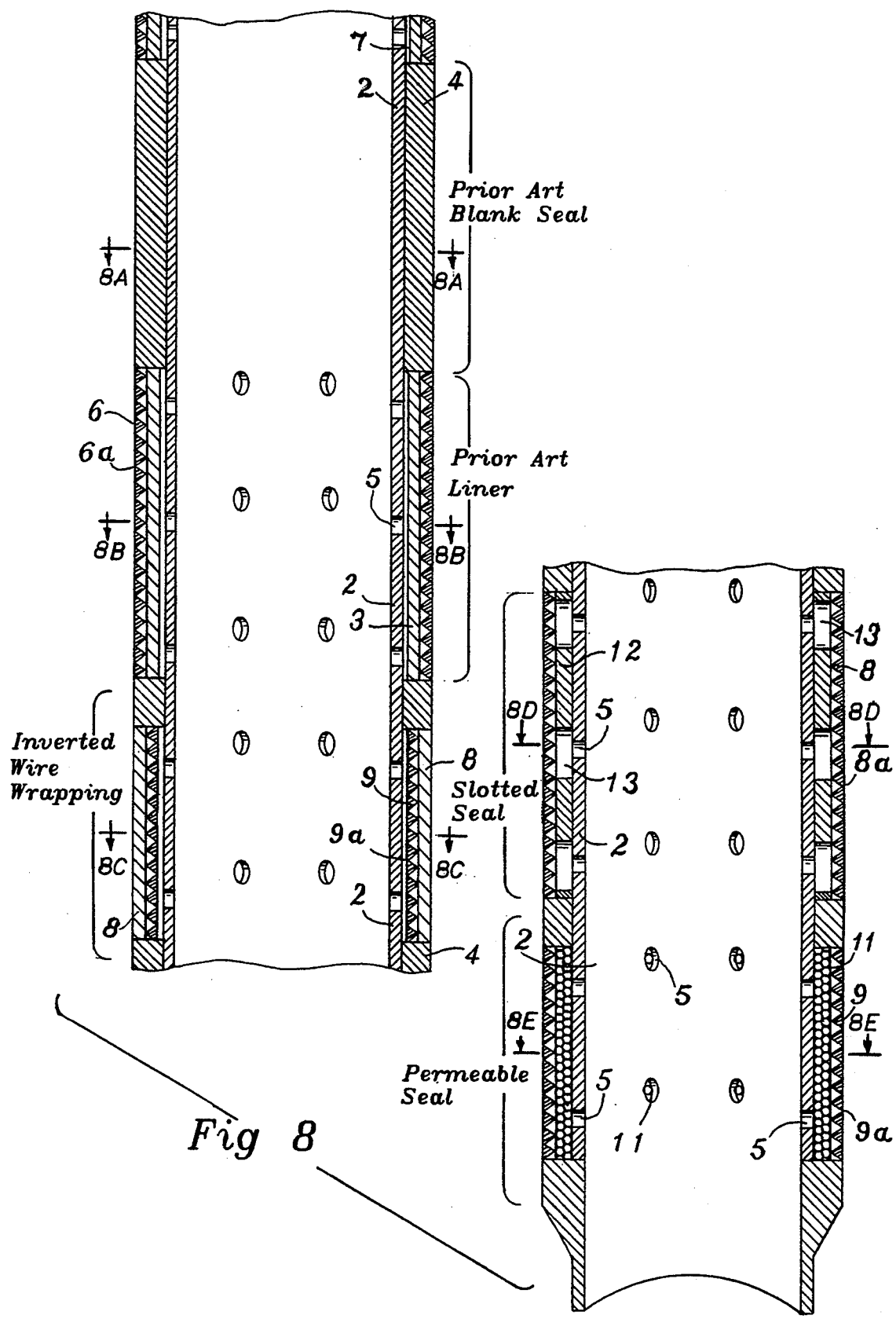
FIGS. 8 and 8A–8E show a longitudinal cross-section of a screen incorporating several embodiments of the present invention and horizontal cross-sections of the several embodiments.
Figure 8A:
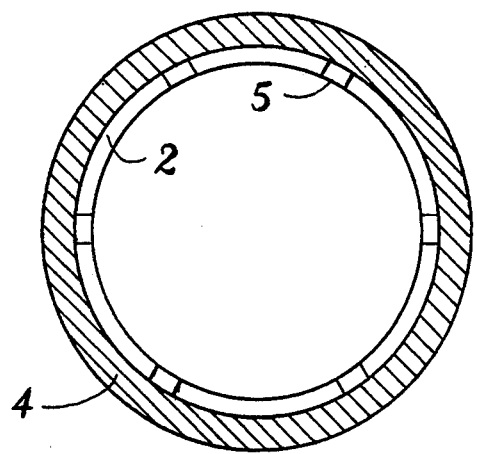
Figure 8B:
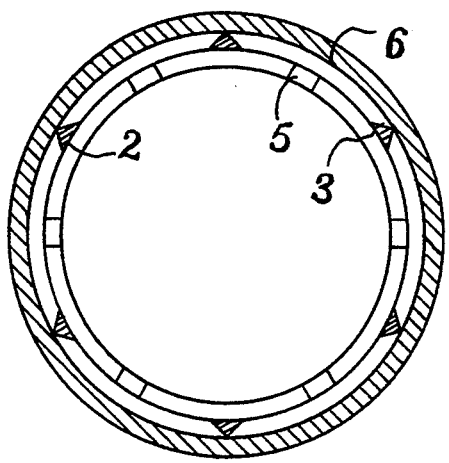
Figure 8C:
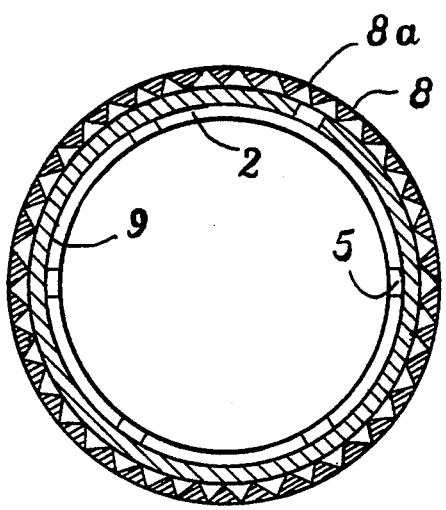
Figure 8D:
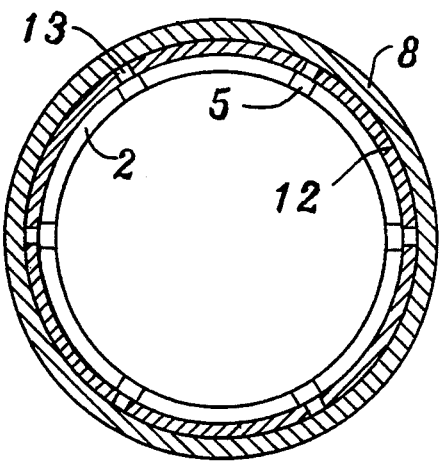
Figure 8E:
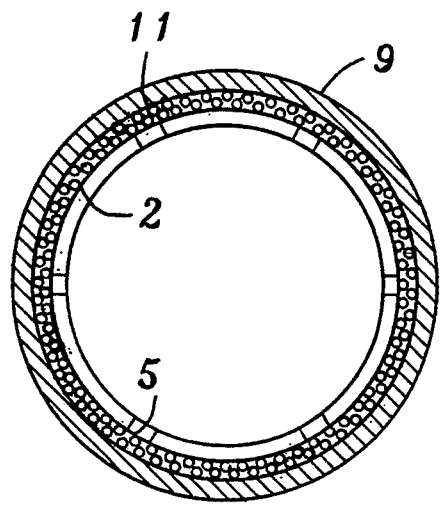

Another embodiment is disclosed in FIG. 8. In FIG. 8, a slotted seal is illustrated between the seals 4. Thus, the seal section comprises a base pipe 2 with apertures 5, surrounded by a cylindrical sleeve 12 with slots 5 that are aligned with the wider apertures 5 on the base pipe 2. The sleeve 12 is surrounded by continuous wire wrapping 8 in a spaced spiral configuration to provide a predetermined constant gap 8a. The cylindrical sleeve 12 essentially fills the inner annulus 7 preventing fluid movement therein, while providing filtering means via the narrow 13 slots on the side wall of the sleeve 12. The slots 13 may be placed horizontally vertically, or diagonally, so long as the slots 13 are aligned with the base pipe 2 apertures 5. The number and placement will, of course, depend on well bore conditions.

The wire wrapped well liner in accordance with the present invention, as illustrated in the various embodiments, will effectively control the injection of acids and fluids into the well liner such that every section of the well liner may be selectively washed and no section of the well liner is bypassed through the inner annulus 7. Previously, in a well using particles such as calcium carbonate to control the fluid loss rate prior to the placement of a seal and Gravel pack, an acid treatment with 15% hydrochloric acid was required to be pumped into the well. The well also subsequently required numerous acid treatments to dissolve enough calcium carbonate to improve the flow rate to be near its potential capacity.

The present invention allows more complete dissolving of the calcium carbonate by isolating sections of the well liner by inserting a squeeze type tool with isolation cups in the base pipe at points matching the seal locations. As acid is injected via the squeeze type tool, it is forced into each isolated section of the well liner and radially out into the formation, without flowing vertically through the well liner inner annulus. Because flow in the inner annulus is restricted, fluid is directed into the intended target formation.

Acid wash techniques using common diverting agents, such as ball sealers, are not practical with prior art well liners, as the acid is able to flow through the inner annulus and run vertically to the same zone it would have gone to without the ball sealers. With the present invention, limited numbers and sizes of holes are provided in the base pipe between the isolation sleeves. For example, isolation sleeves or seals may be provided every three feet throughout the length of the well liner body and the base pipe may be provided with one hole between each interval that is isolated. The diameter of the holes would be determined by the production capacity of the well, or of the interval that is to be isolated.

The isolating sleeves provide a well liner whereby fluids may be injected into selective sections of the well liner to prevent bypassing of fluids through the inner annulus and is also particularly useful in facilitating gravel packing operations in highly deviated wellbores. A well liner having a selective isolation screen will aid in injection of water shut off chemicals, diverting of injected water from thief zones, and other treatments requiring some control of injection into selected locations.

While this invention has been described fully and completely with special emphasis upon a preferred embodiment, it should be understood that within the scope of the appended claims the invention may be practiced otherwise than as specifically described herein.

What is claimed is:

1. A well liner having a selective isolation screen for placement within a well bore comprising:
    a) a tubular member having a first and a second end; said tubular member having a plurality of spaced apertures therethrough;
    b) a spacer means surrounding said tubular member for forming a fluid flow annulus circumferentially surrounding said tubular member and in fluid communication with said apertures on said tubular member;
    c) a screen means surrounding and coupled to said spacer means to form the exterior of said annulus and having openings therethrough to be in fluid communication with said annulus and said apertures; said screen means further being coupled to each said first and second ends;
    d) one or more permeable seal sections vertically spaced on said tubular member at selected vertical locations along the length of said well liner for isolating one or more sections of said annulus and preventing fluid flow between said sections of said annulus corresponding to specific well conditions such as the well length, the spacing of productive formations within said well and the permeability variations of said productive formations exposed to said well liner; said permeable seal sections having means for allowing fluids to flow radially through said permeable seal sections.

2. A well liner according to claim 1 in which said spacer means comprises a plurality of elongate bar members circumferentially spaced and extending longitudinally about the exterior surface of said tubular member; said spacer means being coupled to each of said first and second ends.

3. A well liner according to claim 1 in which said spacer means comprises one or more sleeve members circumferentially surrounding said tubular member and spaced longitudinally about the exterior surface of said tubular member; said sleeve members being coupled to said screen means.

4. A well liner according to claim 1 in which said screen means comprises a continuous wire wrapping coupled to said spacer means in a spaced spiral configuration to provide a predetermined constant gap between said wire wrapping and forming the exterior of said annulus;
    said gap in said wire wrapping sized to prevent movement of the formation sand into said annulus while allowing continual flow of fluid to and from the well bore.

5. A well liner according to claim 4 including one or more of said wire wrapping longitudinally spaced at predetermined vertical locations along the length of said tubular member corresponding to specific well requirements of varying lengths and production formations within the well bore.

6. A well liner having a selective isolation screen for placement within a well bore comprising:
    a) a tubular member having a first and a second end; said tubular member having a plurality of spaced apertures therethrough;
    b) a spacer means surrounding said tubular member for forming a fluid flow annulus circumferentially surrounding said tubular member and in fluid communication with said apertures on said tubular member;

c) a screen means surrounding and coupled to said spacer means to form the exterior of said annulus and having openings therethrough to be in fluid communication with said annulus and said apertures; said screen means further being coupled to each said first and second ends;

d) one or more permeable seal sections vertically spaced on said tubular member at selected vertical locations along the length of said well liner for isolating one or more sections of said annulus and preventing fluid flow between said sections of said annulus corresponding to specific well conditions such as the well length, the spacing of productive formations within said well and the permeability variations of said productive formations exposed to said well liner; said permeable seal sections having means for allowing fluids to flow radially through said permeable seal sections; said permeable seal section comprising i) a first and second seal means vertically spaced on and secured to said tubular member, ii) a first seal section screen means surrounding said tubular member and extending between and coupled to each of said first and second seal means, and iii) a second seal section screen means surrounding said first seal section screen means and extending between and coupled to each of said first and second seal means.

7. A well liner having a selective isolation screen for placement within a well bore comprising:

a) a tubular member having a first and a second end; said tubular member having a plurality of spaced apertures therethrough;

b) a spacer means surrounding said tubular member for forming a fluid flow annulus circumferentially surrounding said tubular member and in fluid communication with said apertures on said tubular member;

c) a screen means surrounding and coupled to said spacer means to form the exterior of said annulus and having openings therethrough to be in fluid communication with said annulus and said apertures; said screen means further being coupled to each said first and second ends;

d) one or more permeable seal sections vertically spaced on said tubular member at selected vertical locations along the length of said well liner for isolating one or more sections of said annulus and preventing fluid flow between said sections of said annulus corresponding to specific well conditions such as the well length, the spacing of productive formations within said well and the permeability variations of said productive formations exposed to said well liner; said permeable seal sections having means for allowing fluids to flow radially through said permeable seal sections; said permeable seal section comprising i) a first and second seal means vertically spaced on and secured to said tubular member, ii) a first seal section screen means surrounding said tubular member, and extending between and coupled to each of said first and second seal means, and iii) a seal section spacer means surrounding said tubular member and extending between and coupled to each of said first and second seal means.

d) a second seal section screen means surrounding said first seal section screen means and extending between and coupled to each of said first and second seal means.

8. A well liner according to claim 6 or 7 in which said first and second seal means each comprise one or more cylindrical sleeve members secured to the exterior of said tubular member at predetermined vertical locations.

9. A well liner according to claim 8 in which said sleeve member comprises a thin cylindrical configuration sized to seal said annulus at selected strategic points to prevent restriction of the flow into or from the productive formations of the well bore.

10. A well liner according to claim 6 in which each of said first and second seal means comprise a circumferentially coupled zone coupling said seal section to said tubular member for isolating and restricting fluid flow within said annulus.

11. A well liner according to claim 6 in which said first seal section screen means comprises a continuous wire wrapping in a spaced spiral configuration to provide a predetermined constant gap between said wire wrapping;

said gap in said wire wrapping sized to prevent movement of the formation sand into said apertures on said tubular member while allowing continual flow of fluid into and from the well bore.

12. A well liner according to claim 6 in which said first seal section screen means comprises a cylindrical sleeve member having apertures therethrough;

said apertures sized to prevent movement of the formation sand into said apertures on said tubular member while allowing continual flow of fluid into and from the well bore.

13. A well liner according to claim 12 in which said apertures comprise circumferentially spaced slots thin enough to prevent formation sand movement while allowing fluid movement.

14. A well liner according to claim 6 in which said second seal section screen means comprises a plurality of elongate bar members circumferentially spaced to provide a predetermined constant gap between said bar members and extending longitudinally about the exterior surface of said first seal section screen means;

said gap in said bar members sized to prevent movement of the gravel into said tubular member while allowing continual flow of fluid into and from the well bore.

15. A well liner according to claim 7 in which said first seal section screen means comprises a permeable particulate means to prevent movement of the formation sand into said apertures on said tubular member while allowing continual flow of fluid into and from the well bore.

16. A well liner according to claim 15 in which said permeable particulate means comprises a mesh material circumferentially spaced about said tubular member.

17. A well liner according to claim 15 in which said permeable particulate means comprises gravel circumferentially spaced about said tubular member.

18. A well liner according to claim 15 in which
said permeable particulate means comprises permeable sintered metal circumferentially spaced about said tubular member.

19. A well liner according to claim 15 in which
said permeable particulate means comprises a permeable wool fiber circumferentially spaced about said tubular member.

20. A well liner according to claim 15 in which
said permeable particulate means comprises permeable knitted weave circumferentially spaced about said tubular member.

21. A well liner according to claim 7 in which said seal section spacer means comprises a plurality of elongate bar members circumferentially spaced.

22. A well liner according to claim 7 in which said seal section spacer means comprises one or more sleeve members spaced longitudinally.

23. A well liner according to claim 7 in which
said second seal section screen means comprises a plurality of elongate bar members circumferentially spaced to provide a predetermined constant gap between said bar members and extending longitudinally about the exterior surface of said first seal section screen means;

said gap in said bar members sized to prevent movement of the gravel into said tubular member while allowing continual flow of fluid into and from the well bore.

24. A well liner according to claim 7 in which said second seal section screen means comprises a continuous wire wrapping in a spaced spiral configuration to provide a predetermined constant gap between said wire wrapping;

said gap in said wire wrapping sized to prevent movement of gravel into said annulus while allowing continual flow of fluid into and from the well bore.

25. A well liner according to claim 1 including gravel or other particulate matter disposed in the outer annulus area between said well liner and the interior of the well bore sized to restrain movement of formation sand through said well liner.

26. A well liner according to claim 1 including a cylindrical casing disposed in the well bore and having a perforated sidewall for allowing fluid to flow thereinto from adjacent formations and gravel or other particulate matter disposed in the outer annulus area between said well liner and the interior of said casing and sized to restrain movement of formation sand through said well liner.

27. A well liner according to claim 7 in which each of said first and second seal means comprise a circumferentially coupled zone coupling said seal section to said tubular member for isolating and restricting fluid flow within said annulus.

* * * * *